United States Patent
Cheng

(10) Patent No.: US 12,253,942 B2
(45) Date of Patent: Mar. 18, 2025

(54) SYSTEM AND METHOD FOR DEFRAGMENTATION OF MEMORY DEVICE

(71) Applicant: YANGTZE MEMORY TECHNOLOGIES CO., LTD., Wuhan (CN)

(72) Inventor: Mo Cheng, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 2 days.

(21) Appl. No.: 17/831,203

(22) Filed: Jun. 2, 2022

(65) Prior Publication Data

US 2023/0195617 A1    Jun. 22, 2023

Related U.S. Application Data

(63) Continuation of application No. PCT/CN2021/139955, filed on Dec. 21, 2021.

(51) Int. Cl.
G06F 12/02        (2006.01)

(52) U.S. Cl.
CPC .. G06F 12/0292 (2013.01); *G06F 2212/7201* (2013.01)

(58) Field of Classification Search
CPC ............ G06F 12/0292; G06F 12/0246; G06F 2212/7201; G06F 2212/1024;
(Continued)

(56) References Cited

U.S. PATENT DOCUMENTS

2014/0215125 A1   7/2014  Sela et al.
2018/0046394 A1   2/2018  Tsao et al.
(Continued)

FOREIGN PATENT DOCUMENTS

CN    10509085 A    10/2015
CN    11831578 A    10/2020
(Continued)

OTHER PUBLICATIONS

International Search Report issued in corresponding International Application No. PCT/CN2021/139955, mailed Sep. 21, 2022, 4 pages.
(Continued)

*Primary Examiner* — Rocio Del Mar Perez-Velez
*Assistant Examiner* — Tong B. Vo
(74) *Attorney, Agent, or Firm* — Bayes PLLC

(57) ABSTRACT

In certain aspects, the memory controller includes a controller memory for storing a logical-to-physical (L2P) address mapping table corresponding to a file, and a controller processor configured to control a memory device, receive a mapping update command, and update the L2P address mapping table according to the mapping update command by replacing original logical addresses of logical block address (LBA) segments of the file with new continuous logical addresses of a merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file.

14 Claims, 11 Drawing Sheets

(58) Field of Classification Search
CPC ....... G06F 2212/1044; G06F 2212/214; G06F 2212/7205; G06F 3/0608; G06F 3/0611; G06F 3/064; G06F 3/0679; G06F 3/0658; G06F 3/0659; G06F 2206/1004; G06F 2212/1032; Y02D 10/00

See application file for complete search history.

(56) References Cited

U.S. PATENT DOCUMENTS

| | | |
|---|---|---|
| 2019/0065395 A1* | 2/2019 | Fujita .................... G06F 3/0679 |
| 2019/0188127 A1 | 6/2019 | Lee |
| 2021/0064291 A1* | 3/2021 | Kanno ................ G06F 12/0246 |
| 2021/0064526 A1* | 3/2021 | Palmer .................. G06F 3/0656 |
| 2021/0200670 A1 | 7/2021 | Wintrfeld et al. |
| 2021/0390048 A1* | 12/2021 | Li ........................ G06F 16/164 |
| 2022/0100608 A1* | 3/2022 | Yu ........................ G06F 11/1446 |
| 2022/0137862 A1* | 5/2022 | Nanzawa .............. G06F 3/0679 711/154 |
| 2023/0068089 A1* | 3/2023 | Choi ...................... G06F 3/065 |

FOREIGN PATENT DOCUMENTS

| | | |
|---|---|---|
| CN | 113254358 A | 8/2021 |
| JP | 2005202942 A | 7/2005 |
| JP | 2010532023 A | 9/2010 |
| JP | 2012108912 A | 6/2012 |
| JP | 2019045955 A | 3/2019 |

OTHER PUBLICATIONS

Supplementary European Search Report issued in corresponding European Application No. 21943332.3, mailed Nov. 20, 2023, 9 pages.

* cited by examiner

SYSTEM AND METHOD FOR DEFRAGMENTATION OF MEMORY DEVICE

CROSS-REFERENCE TO RELATED APPLICATIONS

This application is a continuation of International Application No. PCT/CN2021/139955, filed on Dec. 21, 2021, entitled "SYSTEM AND METHOD FOR DEFRAGMENTATION OF MEMORY DEVICE," which is hereby incorporated by reference in its entirety.

BACKGROUND

The present disclosure relates to systems and methods for defragmentation of a memory device.

Data stored in the system and the memory device becomes fragmented over time. It slows down the performance of the system and the memory device by reducing the access and processing speed. Sometimes, it further causes undesirable corruption and data loss. Defragmentation is a process that reduces the degree of fragmentation by reorganizing a storage device's data for faster access and better system performance.

SUMMARY

In one aspect, the memory controller includes a controller memory for storing a logical-to-physical (L2P) address mapping table corresponding to a file, and a controller processor configured to control a memory device, receive a mapping update command, and update the L2P address mapping table according to the mapping update command by replacing original logical addresses of logical block address (LBA) segments of the file with new continuous logical addresses of a merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file.

In some implementations, the controller memory includes a volatile controller memory for storing the L2P address mapping table corresponding to the file.

In some implementations, the controller memory further includes a non-volatile controller memory. The controller processor is configured to store the updated L2P address mapping table in the non-volatile controller memory as a non-volatile L2P address mapping table.

In some implementations, the controller processor is configured to transmit an instruction to a host acknowledging that the L2P address mapping table has been updated.

In some implementations, the controller processor is configured to generate a merge log by recording the new mapping relation between the new continuous logical addresses of the merged LBA segment of the file and the physical addresses of the file.

In some implementations, in response to a sudden power loss, the controller processor is configured to rebuild the volatile L2P address mapping table according to a merge log recording the new mapping relation between the new continuous logical addresses of the merged LBA segment of the file the physical addresses of the file after a memory system being restarted.

In some implementations, the controller processor is configured to scan a physical-to-logical (P2L) address mapping table of a metadata block and the merge log, and in response to the merge log being updated, the controller processor is configured to rebuild the L2P address mapping table according to the merge log.

In another aspect, a memory system includes a memory device including a physical data block, and a memory controller including a controller memory for storing a logical-to-physical (L2P) address mapping table corresponding to a file, and a controller processor configured to control the memory device, receive a mapping update command, and update the L2P address mapping table according to the mapping update command by replacing original logical addresses of logical block address (LBA) segments of the file with new continuous logical addresses of a merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file.

In some implementations, the controller memory includes a volatile controller memory for storing the L2P address mapping table corresponding to the file.

In some implementations, the controller memory further includes a non-volatile controller memory. The controller processor is configured to store the updated the L2P address mapping table in the non-volatile controller memory as a non-volatile L2P address mapping table.

In some implementations, the controller processor is configured to transmit an instruction to a host acknowledging that the L2P address mapping table has been updated.

In some implementations, the controller processor is configured to generate a merge log by recording the new mapping relation between the new continuous logical addresses of the merged LBA segment of the file and the physical addresses of the file.

In some implementations, in response to a sudden power loss, the controller processor is configured to rebuild the L2P address mapping table according to a merge log recording the new mapping relation between the new continuous logical addresses of the merged LBA segment of the file the physical addresses of the file after the memory system being restarted.

In some implementations, the controller processor is configured to scan a physical-to-logical (P2L) address mapping table of a metadata block and the merge log, and in response to the merge log being updated, the controller processor is configured to rebuild the L2P address mapping table according to the merge log.

In still another aspect, a system includes a host including a host memory configured to store a file, and a host processor configured to execute a merge LBA command to rearrange original logical addresses of logical block address (LBA) segments of the file into new continuous logical addresses of a merged LBA segment of the file and send a mapping update command, and a memory system including a memory device comprising a physical data block, and a memory controller including a controller memory for storing a logical-to-physical (L2P) address mapping table corresponding to the file, and a controller processor configured to control the memory device, receive the mapping update command, and update the L2P address mapping table according to the mapping update command by replacing the original logical addresses of the LBA segments of the file with the new continuous logical addresses of the merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file.

In some implementations, the controller memory includes a volatile controller memory for storing the L2P address mapping table corresponding to the file.

In some implementations, the host processor is configured to rearrange the original logical addresses of the LBA segments of the file into the new logical addresses of the merged LBA segment of the file by rewriting all logical addresses of the LBA segments of the file into a free or unused LBA segment with logical addresses in continuous and sequential order such that it becomes new continuous logical addresses of the merged LBA segment of the file.

In some implementations, the host processor is configured to send the mapping update command causing the memory controller to update the L2P address mapping table according to new continuous logical addresses of the merged LBA segment of the file.

In some implementations, the host processor is configured to receive an instruction from the memory controller acknowledging that the L2P address mapping table has been updated.

In some implementations, the host processor is configured to update an index node of the file after acknowledging that the L2P address mapping table has been updated.

In some implementations, the host processor is configured to update the index node of the file by pointing to a new LBA segment with the new continuous logical addresses of the merged LBA segment.

In yet still another aspect, a method for operating a memory controller includes receiving a mapping update command from a host, and updating a logical-to-physical (L2P) address mapping table according to the mapping update command by replacing the original logical addresses of the LBA segments of the file with the new continuous logical addresses of the merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file.

In some implementations, the method further includes transmitting an instruction to the host acknowledging that the L2P address mapping table has been updated.

In some implementations, the method further includes recording, in a merge log, the new mapping relation between the new continuous logical addresses of the merged LBA segment of the file and the physical addresses of the file, and in response to a sudden power loss, rebuilding the L2P address mapping table according to the merge log after a memory system is restarted.

In some implementations, rebuilding the L2P address mapping table includes scanning a physical-to-logical (P2L) address mapping table of a metadata block and the merge log, and in response to determining that the merge log being updated, rebuilding the L2P address mapping table according to the merge log.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

Figure 1:
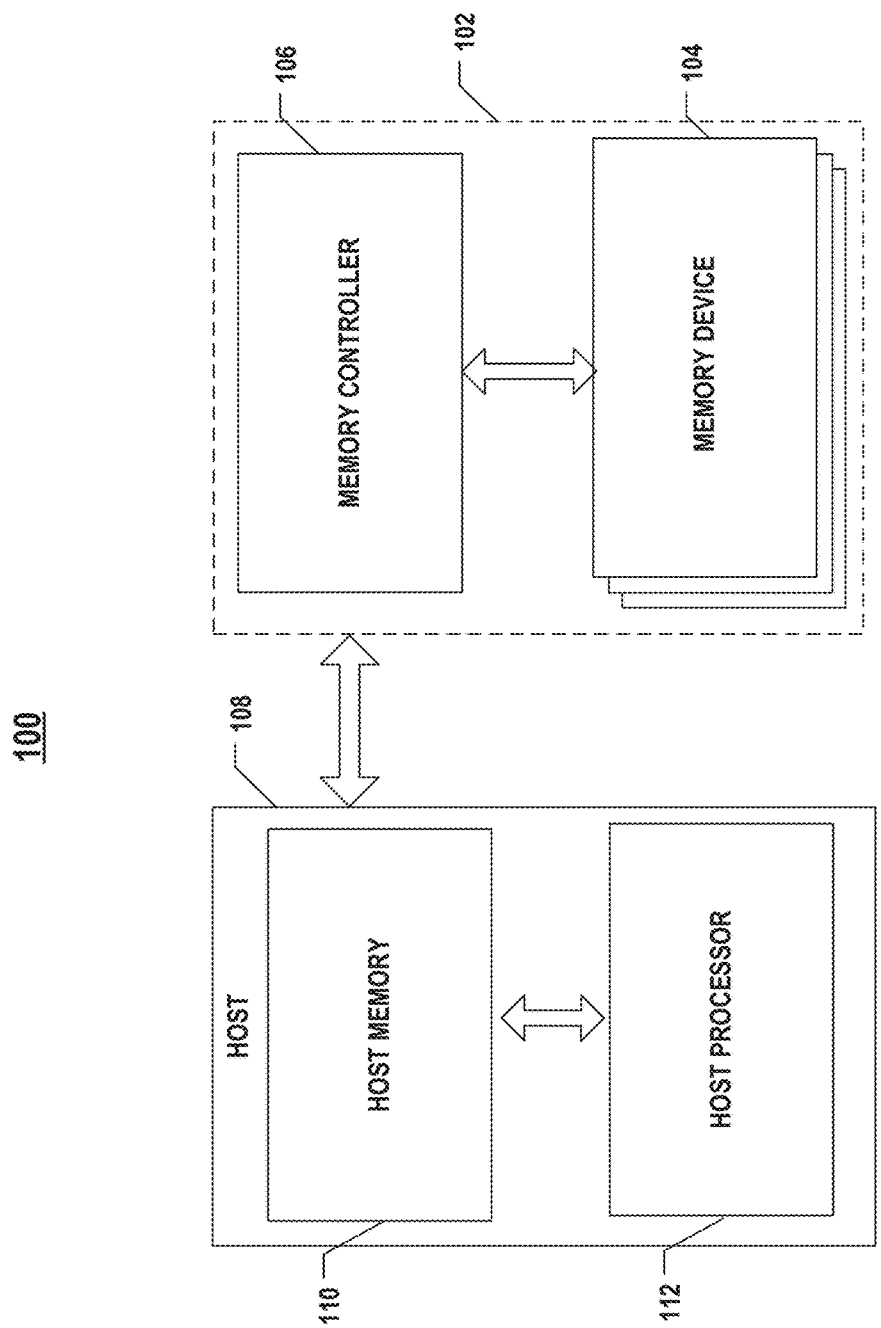
FIG. 1 illustrates a block diagram of an exemplary system having a host and a memory system, according to some aspects of the present disclosure.

Aspects of the present disclosure will be described with reference to the accompanying drawings.

DETAILED DESCRIPTION

Although specific configurations and arrangements are described, it should be understood that this is done for illustrative purposes only. As such, other configurations and arrangements can be used without departing from the scope of the present disclosure. Also, the present disclosure can be employed in a variety of other applications. Functional and structural features as described in the present disclosure can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Disk defragmentation is a technique that allows users to defragment not only hard disk drive (HDD) but also other removable storage. For instance, Windows system, such as Windows 7, includes a disk defragmentation utility called Microsoft Drive Optimizer or Disk Defragmenter that allows users to defrag their hard disk and increase the data access speed by rearranging files stored on the disk to occupy contiguous storage locations and improve computer's overall performance. Disk defragmentation, however, does not deem effective in solid-state drive (SSD). In fact, it is generally not recommended to defrag an SSD since it may use up write cycles of the SSD and potentially causes early death of the SSD. Nevertheless, with the development of the SSD and the increasing storage capacity in the SSD, the input/output stack (I/O stack) of software (SW) becomes a bottleneck of the system. That is, the fragmented file at the logical level reduces the performance of the system.

One of the solutions to solve fragmentation at the logical level is to use a defragmenter such as e2defrag. The e2defrag may read every segment of the logical address of a file and select a continuous logical address block to write. However, the e2defrag may not only update the logical address block but also update the physical block each time updating the logical address block, thereby increasing an effect of write amplification, which is an undesirable phenomenon associated with flash memory and solid-state drives where the actual amount of information physically written to the storage media is a multiple of the logical amount intended to be written. This write amplification may burn out the SSD fast than expected and shorten the lifespan of the SSD. Furthermore, conventional e2defrag is time-consuming due to its lengthy process of reading segments and routinely updating the physical address block each time updating the logical address block. It is not effective enough to solve the fragmentation problem at the logical level.

Moreover, conventional defragmentation tools may not have a very well design for power loss protection to ensure that the data is not lost while the SSD is writing data when a sudden power failure occurs. The sudden power loss may cause significant system corruption or data loss when the process of defragmentation is undergoing. A mechanism to prevent data loss from sudden power loss during defragmentation is highly desirable.

To address one or more of the aforementioned issues, the present disclosure introduces a solution in which a merged logical block address (LBA) command is designed to merge segments of LBA in a file into a merged LBA segment of the file and update a logical to physical (L2P) address mapping table according to the merged LBA segments of the file. Furthermore, a merge log is created to record a mapping relation between the L2P address mapping table and the physical-to-logical (P2L) address mapping table before updating the L2P address mapping table. Therefore, after a sudden power loss, the L2P can be rebuilt or restored by using the merge log and the P2L address mapping table.

FIG. 1 illustrates a block diagram of an exemplary system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 having a host memory 110 and a host processor 112, and a memory system 102 having one or more memory devices 104 and a memory controller 106.

Host 108 can be a processor of an electronic device, such as a central processing unit (CPU), or a system-on-chip (SoC), such as an application processor (AP). Host 108 can be coupled to memory controller 106 and configured to send or receive data to or from memory devices 104 through memory controller 106. For example, host 108 may send the program data in a program operation or receive the read data in a read operation. Host processor 112 can be a control unit (CU), or an arithmetic & logic unit (ALU). Host memory 110 can be memory units including register or cache memory. Host 108 is configured to receive and transmit instructions and commands to and from memory controller 106 of memory device 102, and execute or perform multiple functions and operations provided in the present disclosure, which will be described later.

Memory device 104 can be any memory device disclosed in the present disclosure, such as a NAND Flash memory device, which includes a page buffer having multiple portions, for example, four quarters. It is noted that the NAND Flash is only one example of the memory device for illustrative purposes. It can include any suitable solid-state, non-volatile memory, e.g., NOR Flash, Ferroelectric RAM (FeRAM), Phase-change memory (PCM), Magnetoresistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

Memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment SSDs or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations, by providing instructions, such as read instructions, to memory device 104. For example, memory controller 106 may be configured to provide a read instruction to the peripheral circuit of memory device 104 to control the read operation. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104.

Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
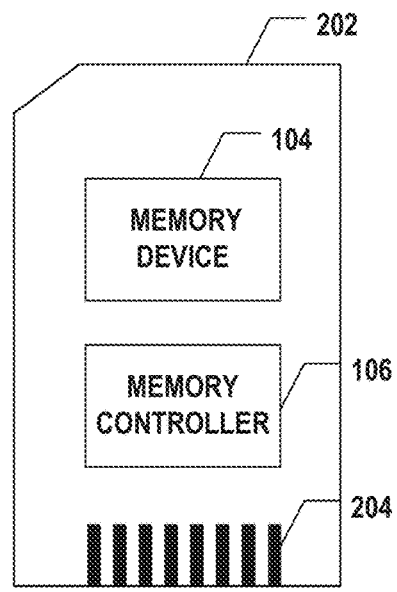
FIG. 2A illustrates a diagram of an exemplary memory card having a memory device, according to some aspects of the present disclosure.
Figure 2B:
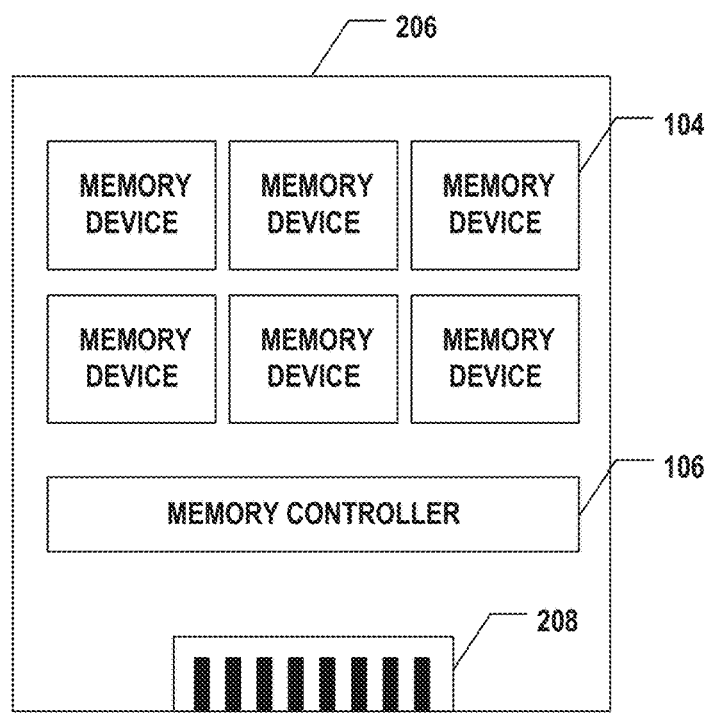
FIG. 2B illustrates a diagram of an exemplary solid-state drive (SSD) having a memory device, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Memory control 106 is configured to receive and transmit a command to and from host 108, and execute or perform multiple functions and operations provided in the present disclosure, which will be described later.

Figure 3:
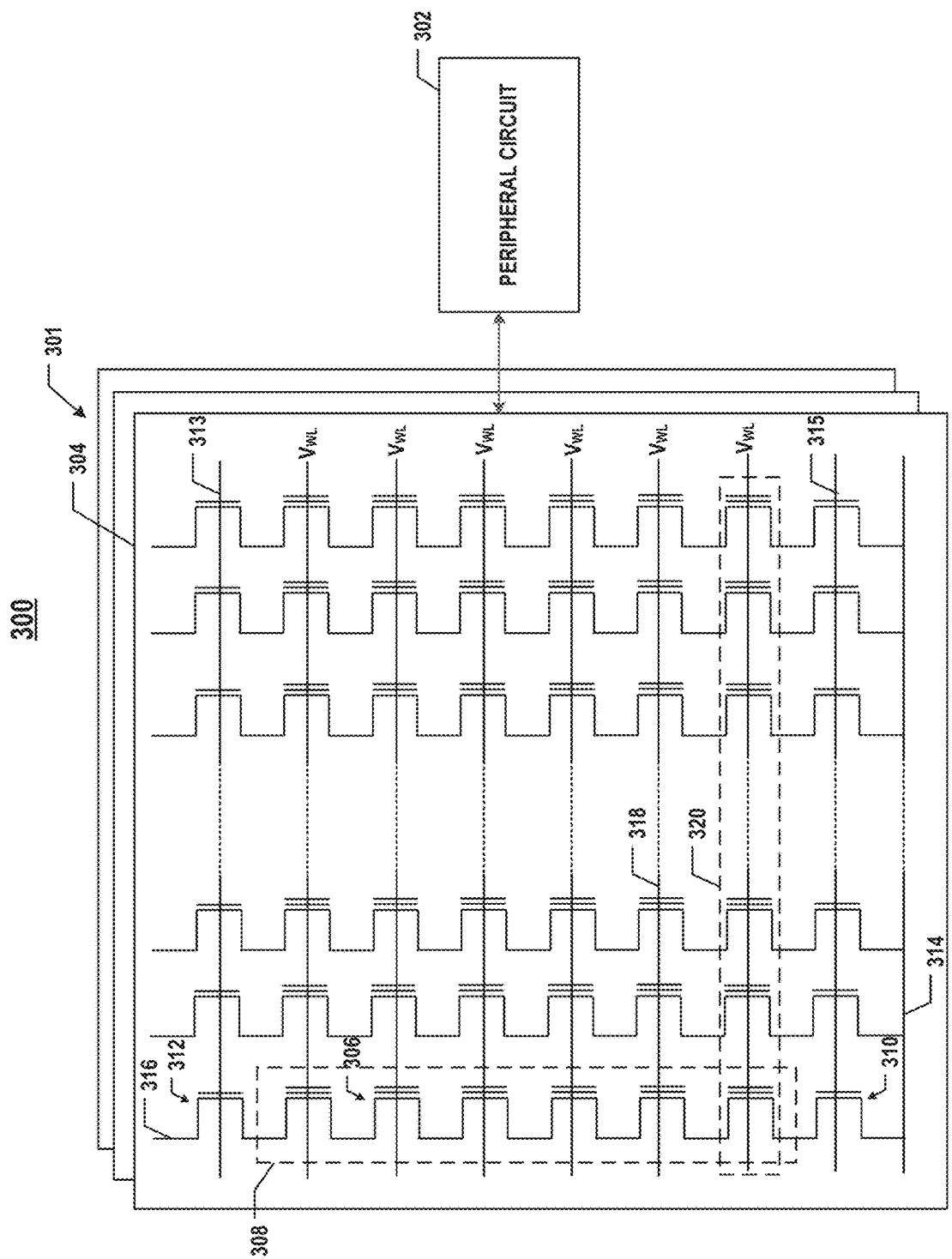
FIG. 3 illustrates a schematic diagram of an exemplary memory device including peripheral circuits, according to some aspects of the present disclosure.

FIG. 3 illustrates a schematic circuit diagram of an exemplary memory device 300 including peripheral circuits, according to some aspects of the present disclosure. Memory device 300 can be an example of memory device 104 in FIG. 1. It is noted that the NAND Flash disclosed herein is only one example of the memory device for illustrative purposes. It can include any suitable solid-state, non-volatile memory, e.g., NOR Flash, FeRAM, PCM, MRAM, STT-RAM, or RRAM, etc. Memory device 300 can include a memory cell array 301 and peripheral circuits 302 coupled to memory cell array 301. Memory cell array 301 can be a NAND Flash memory cell array in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, which depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3, each NAND memory string 308 can include a source select gate (SSG) transistor 310 at its source end and a drain select gate (DSG) transistor 312 at its drain end. SSG transistor 310 and DSG transistor 312 can be configured to activate selected NAND memory strings 308 (columns of the array) during read and program operations. In some implementations, the sources of NAND memory strings 308 in the same block 304 are coupled through a same source line (SL) 314, e.g., a common SL. In other words, all NAND memory strings 308 in the same block 304 have an array common source (ACS), according to some implementations. The drain of DSG transistor 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of DSG transistor 312) or a deselect voltage (e.g., 0 V) to the gate of respective DSG transistor 312 through one or more DSG lines 313 and/or by applying a select voltage (e.g., above the threshold voltage of SSG transistor 310) or a deselect voltage (e.g., 0 V) to the gate of respective SSG transistor 310 through one or more SSG lines 315.

As shown in FIG. 3, NAND memory strings 308 can be organized into multiple blocks 304, each of which can have a common source line 314, e.g., coupled to the ACS. In some implementations, each block 304 is the basic data unit for erase operations, i.e., all memory cells 306 on the same block 304 are erased at the same time. To erase memory cells 306 in a selected block 304, source lines 314 coupled to selected block 304 as well as unselected blocks 304 in the same plane as selected block 304 can be biased with an erase voltage (Vers), such as a high positive voltage (e.g., 20 V or more). Memory cells 306 of adjacent NAND memory strings 308 can be coupled through word lines 318 that select which row of memory cells 306 is affected by the read and program operations. In some implementations, each word line 318 is coupled to a page 320 of memory cells 306, which is the basic data unit for the program and read operations. The size of one page 320 in bits can relate to the number of NAND memory strings 308 coupled by word line 318 in one block 304. Each word line 318 can include a plurality of control gates (gate electrodes) at each memory cell 306 in respective page 320 and a gate line coupling the control gates. Peripheral circuits 302 can be coupled to memory cell array 301 through bit lines 316, word lines 318, source lines 314, SSG lines 315, and DSG lines 313. Peripheral circuits 302 can include any suitable analog, digital, and mixed-signal circuits for facilitating the operations of memory cell array 301 by applying and sensing voltage signals and/or current signals to and from each target memory cell 306 through bit lines 316, word lines 318, source lines 314, SSG lines 315, and DSG lines 313. Peripheral circuits 302 can include various types of peripheral circuits formed using metal-oxide-semiconductor (MOS) technologies.

Figure 4A:
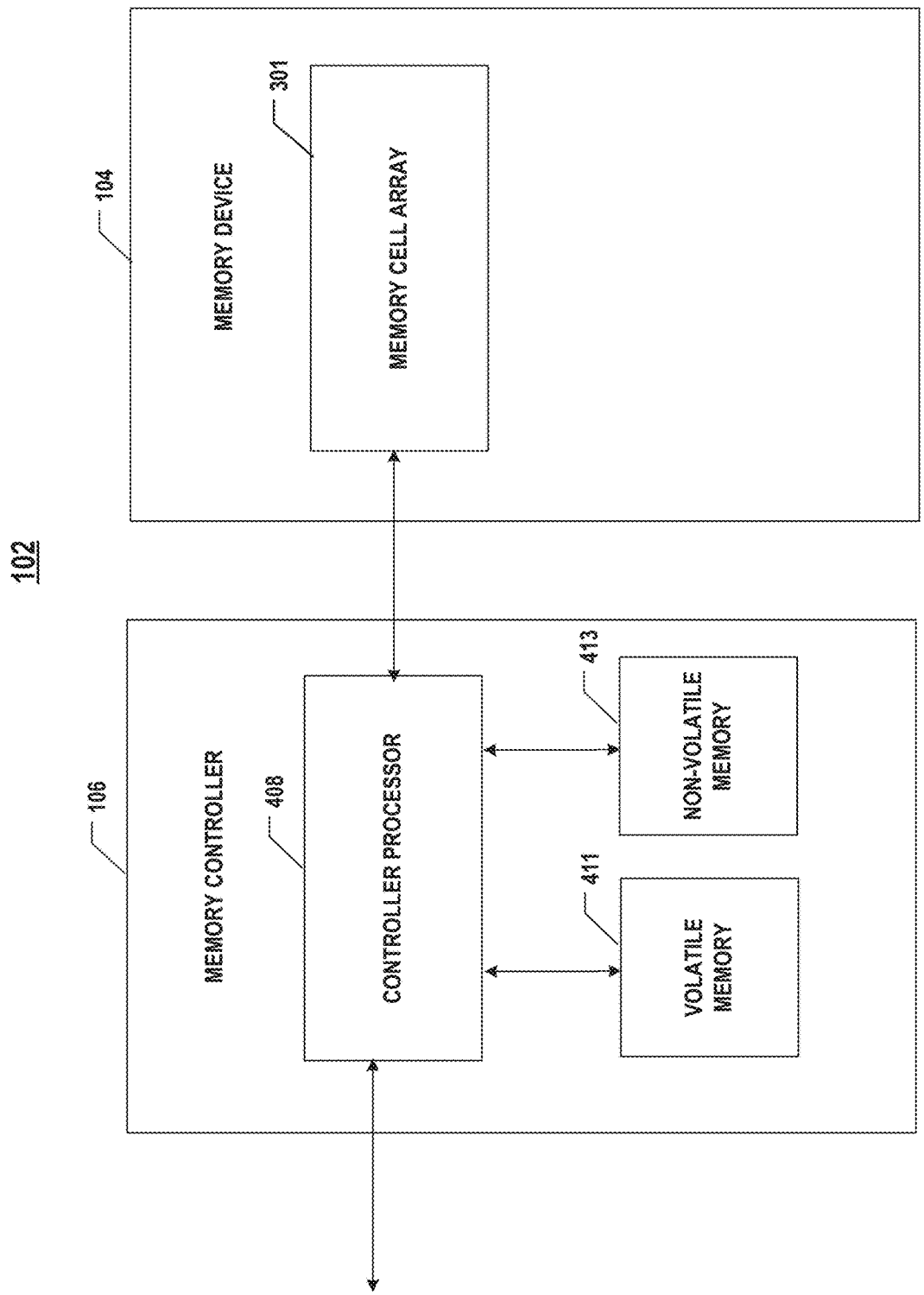
FIG. 4A illustrates a block diagram of an exemplary memory system including a memory controller and a memory device, according to some aspects of the present disclosure.

FIG. 4A illustrates a block diagram of an exemplary memory system 102 including a memory controller 106 and a memory device 104, according to some aspects of the present disclosure. As shown in FIG. 4A, memory controller 106 can include a controller processor 408, such as a memory chip controller (MCC) or a memory controller unit (MCU). Controller processor 408 is configured to control modules to execute commands or instructions to perform functions disclosed in the present disclosure. Controller processor 408 can also be configured to control the operations of each peripheral circuit by generating and sending various control signals, such as read commands for read operations. Controller processor 408 can also send clock signals at desired frequencies, periods, and duty cycles to other peripheral circuits 302 to orchestrate the operations of each peripheral circuit 302, for example, for synchronization. Memory controller 106 can further include a volatile controller memory 411 and a non-volatile controller memory. Volatile controller memory 411 can include a register or cache memory such that it allows a faster access and process speed to read, write, or erase the data stored therein, while it may not retain stored information after power is removed. In some implementations, volatile controller memory 411 includes dynamic random-access memory (DRAM), Static random-access memory (SRAM). Non-volatile controller memory 413 can retain the stored information even after power is removed. In some implementations, non-volatile controller memory 413 includes NAND, NOR, FeRAM, PCM, MRAM, STT-RAM, or RRAM. Memory device 104 can include a memory cell array such as memory cell array 301 in FIG. 3. In some implementations, non-volatile controller memory 413 can be not provided in the memory controller 106, for example, non-volatile controller memory 413 is deposed outside of the memory controller 106 but is coupled to the memory controller 106. In some implementations, the controller memory (e.g., 411 or 413) is configured to store the L2P address mapping table (e.g., 4271, 4273) corresponding to the file (e.g., 129).

Figure 4B:
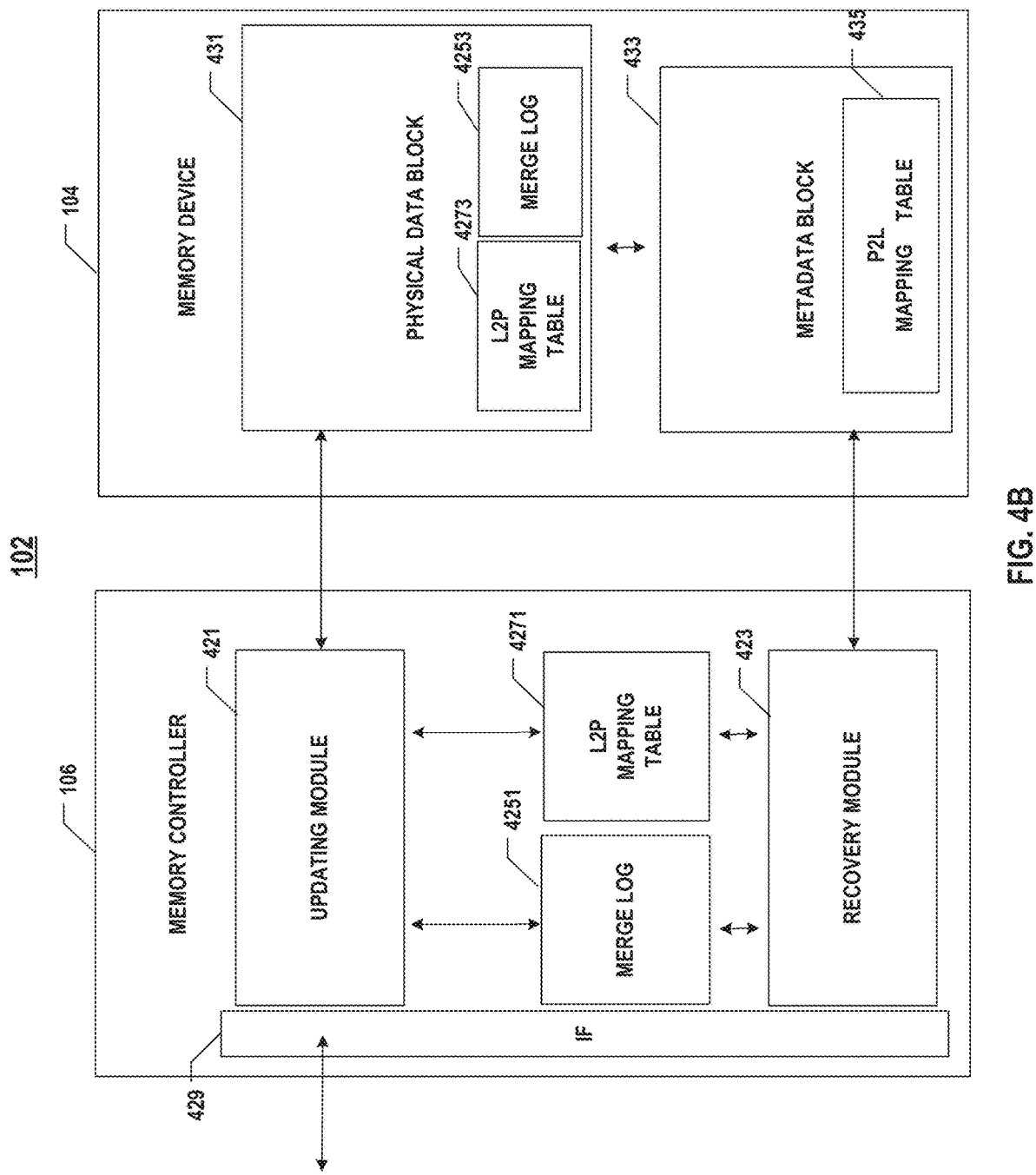
FIG. 4B illustrates a block diagram of an exemplary memory system including a memory controller and a memory device, according to some aspects of the present disclosure.

FIG. 4B illustrates a block diagram of the exemplary memory system 102 including memory controller 106 and memory device 104, according to some aspects of the present disclosure. As shown in FIG. 4B, memory controller 106 can include a memory controller interface 429 configured to receive and transmit commands or instructions to and from the host (e.g., host 108 in FIG. 1). In some implementations, memory controller interface 429 is coupled to the controller processor 408 and to receive and transmit commands or instructions that cause controller processor 408 to perform functions disclosed in the present disclosure.

Memory controller 106 can also include an updating module 421 configured to generate and update a volatile L2P address mapping table 4271, a volatile merge log 4251, a non-volatile L2P mapping table 4273, and a non-volatile merge log 4253. Updating module 421 may be implemented through a firmware program in the firmware of controller processor 408. In some implementations, updating module 421 is configured to update a physical data block 431 and/or a metadata block 433 in memory device 104. In some implementations, updating module 421 is in controller processor 408 or coupled to controller processor 408, and may be controlled by controller processor 408 to execute commands and instructions from host 108. For instance, updating module 421 is configured to execute a mapping update command received from host 108 and update volatile L2P address mapping table 4271 according to the mapping update command. In some implementations, updating module 421 is configured to update volatile L2P address mapping table 4271 by rewriting a continuous logical address of a merged LBA segment of a file into volatile L2P address mapping table 4271. In some implementations, updating module 421 is configured to update volatile L2P address mapping table 4271 by replacing original logical addresses of LBA segments of the file 129 with new continuous logical addresses of a merged LBA segment of the file, and changing an original mapping relation between the original logical addresses of the LBA segment of the file and physical addresses of the file, to a new mapping relation between the new continuous logical addresses of the merged LBA segment of the file and the physical addresses of the file. The process of forming the continuous logical address of the merged LBA segments of the file will be described later. And, after updating L2P address mapping table 4271, updating module 421 in controller processor 408 will transmit an instruction correspondingly to host 108 acknowledging that volatile L2P address mapping table 4271 has been updated, so that host 108 may update the index node of the file in host memory 110.

In some implementations, volatile L2P address mapping table 4271 is stored and processed in volatile controller memory 411 and is configured to be transmitted and updated to non-volatile L2P address mapping table 4273 stored in physical data block 431 so that the data will not be erased after power off. In some implementations, after the system being restarted, volatile L2P address mapping table 4271 in volatile controller memory 411 can be loaded from non-volatile L2P address mapping table 4273 in physical data block 431 for faster access and processing speed on a regular basis. In some implementations, non-volatile L2P address mapping table 4273 can also be stored in non-volatile controller memory 413 of memory controller 106.

Merge log (e.g., volatile merge log 4251 and non-volatile merge log 4253) is configured to record a mapping relation between the L2P address mapping table (e.g., 4271 or 4273) and the physical address of physical data block 431 before the updating of the L2P address mapping table. In some implementations, the merge log is configured to record a new mapping relation between the new continuous logical addresses of the merged LBA segment of file 129 and the physical addresses of file 129 each updating the L2P address mapping table. Therefore, after a sudden power loss, volatile L2P address mapping table 4271, which may not be updated yet, can be rebuilt or restored by using non-volatile merge log 4253 and the physical address of physical data block 431 after the system (e.g., 100) is restarted. It is noted that, in some implementations, the updating rate of non-volatile merge log 4253 is faster than non-volatile L2P address mapping table 4273 such that it is already recorded during a sudden power loss while it may not cause excessive write amplification since it is relatively small data comparing to non-volatile L2P address mapping table 4273. Specifically, in response to a sudden power loss, a recovery module 423 in controller processor 408 may scan a physical-to-logical (P2L) address mapping table 435 in metadata block 433 in memory device 104 and non-volatile merge log 4253, and in response to that non-volatile merge log 4253 being updated, rebuild volatile L2P address mapping table 4271 according to non-volatile merge log 4253 and the physical address of physical data block 431 retained before the sudden power loss. And in response to that non-volatile merge log 4253 is not updated, rebuild volatile L2P address mapping table 4271 according to physical-to-logical (P2L) address mapping table 435 of metadata block 433 and the physical address of physical data block 431 retained before the sudden power loss. It is noted that metadata block 433 is a relatively small piece of a data block in memory cell array 301. Metadata block 433 is configured to store logical address information of the data stored in physical data block 431. The logical address information is written into metadata block 433 simultaneously when writing data into physical data block 431 so that it can recover data after the sudden power loss. In some implementations, volatile merge log 4251 is stored and processed in volatile controller memory 411 and is configured to be transmitted and updated to non-volatile merge log 4253 stored in physical data block 431 so that the data will not be erased after power off. In some implementations, after the system being restarted, volatile merge 4251 in volatile controller memory 411 can be loaded from non-volatile merge log 4253 in physical data block 431 for faster access and processing speed on a regular basis. In some implementations, non-volatile merge log 4253 can also be stored in non-volatile controller memory 413 of memory controller 106. Recovery module 423 may be implemented through a firmware program in the firmware of controller processor 408.

Figure 5:
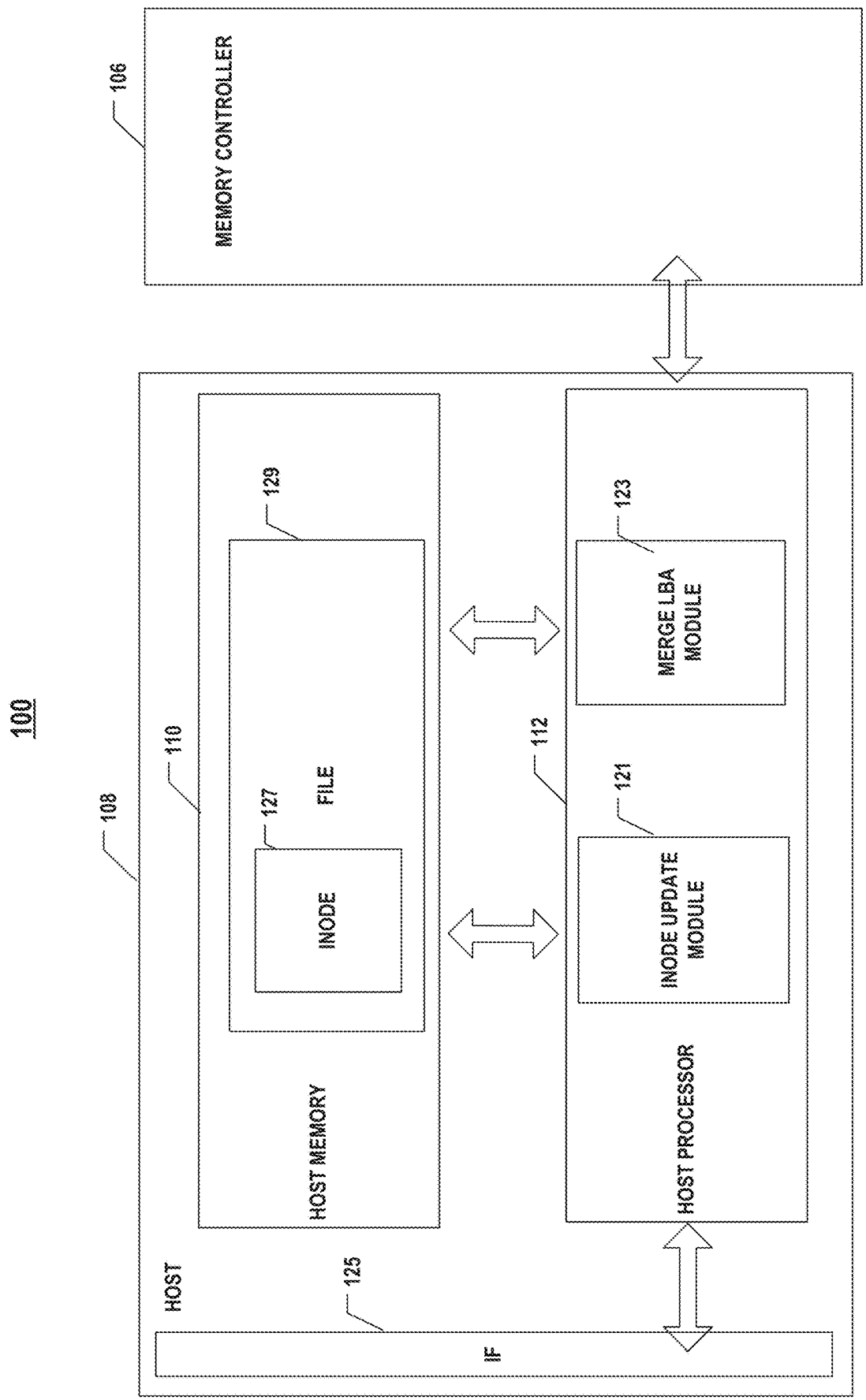
FIG. 5 illustrates a block diagram of an exemplary system including a host and a memory controller, according to some aspects of the present disclosure.

FIG. 5 illustrates a block diagram of the exemplary system 100 including host 108 and memory controller 106, according to some aspects of the present disclosure. As shown in FIG. 5, host 108 may include a host interface 125, host memory 110, and host processor 112. Host interface 125 is configured to receive commands or instructions from a user to perform or execute specific functions or operations. Host memory 110 may store logical addresses, e.g., a logical block address (LBA) of files (e.g., file 129), and an index node 127 (e.g., inode) of the files. Host processor 112 may include or be coupled to an index node updating module 121 (e.g., inode updating module) and a merge LBA module 123. Index node updating module 121 is configured to update index node 127 of the files after controller processor 408 (e.g., in FIG. 4B) of memory controller 106 transmits an instruction to host 108, acknowledging that volatile L2P address mapping table 4271 has been updated. Index node updating module 121 can also update index node 127 of the files after receiving an instruction that physical data block 431 (e.g., in FIG. 4B) has been updated. It is noted that the index node (e.g., inode) may be a data structure in a Unix-style file system that describes a file-system object such as a file or a directory. It can be a file data structure that stores information about any Linux file except its name and data. It stores metadata of the file including the file size, the device on which the file is stored, user and group IDs associated with the file, or permissions needed to access the file. In some implementations, host processor 112 is configured to update index node 127 of file 129 by pointing to a new LBA segment with the continuous logical addresses of the merged LBA segment.

Figure 6:
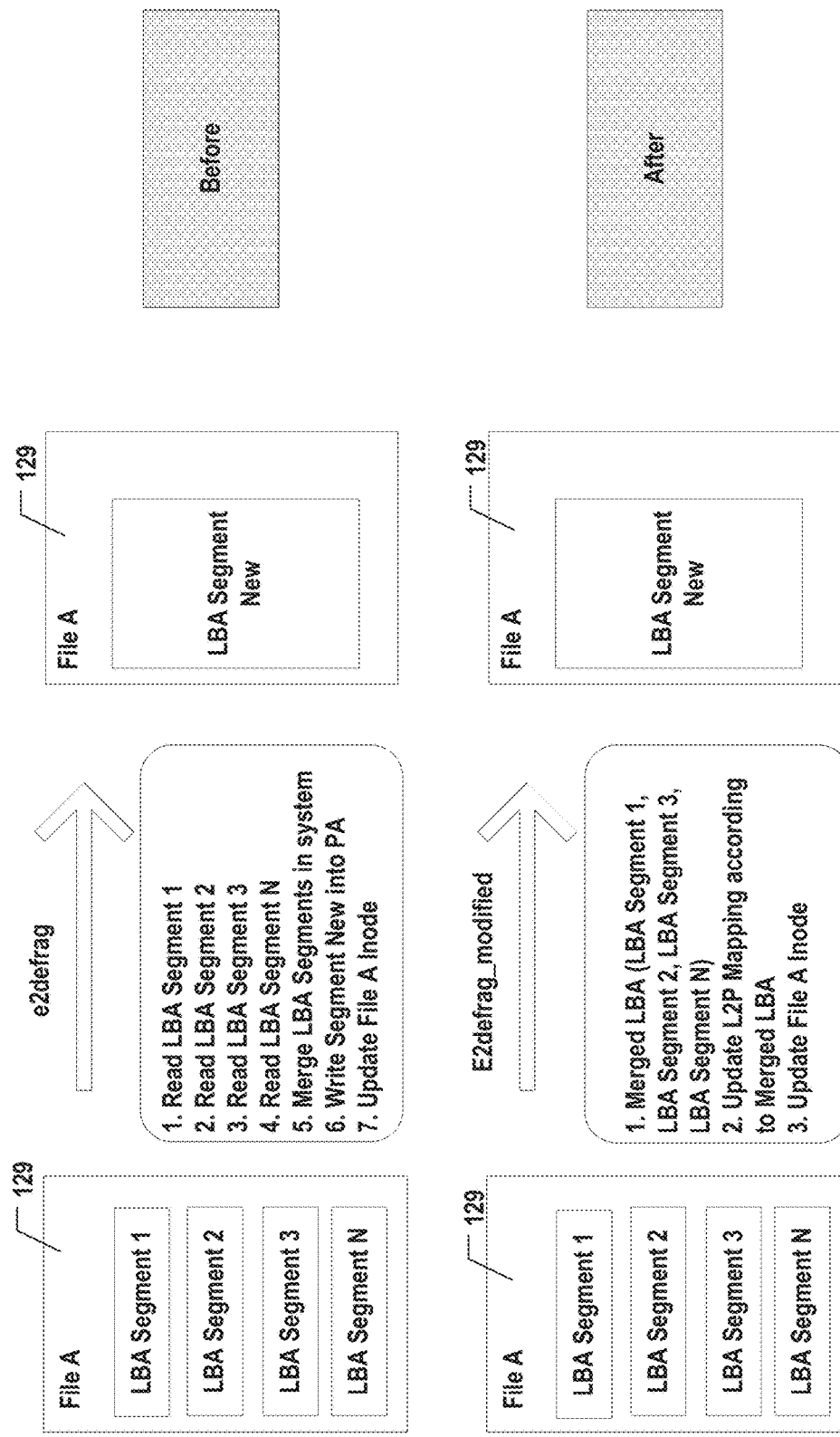
FIG. 6 illustrates a block diagram illustrating an exemplary defragmentation scheme, according to some aspects of the present disclosure.

Merge LBA module 123 that is included or coupled to host processor 112 is configured to execute a merge LBA command to rearrange the LBA segments (e.g., fragments of the logical address in a logical block) of file 129 into a merged LBA segment. For example, as in FIG. 6, file A 129 may include one or more LBA segments (e.g., LBA segment 1, LBA segment 2, LBA segment 3 . . . , LBA segment N). When files are modified each time in the operation system, the number of the LBA segments increases, and the file becomes fragmented. When using the conventional e2defrag tool, as mentioned above, it may require reading multiple LBA segments one by one and finding a continuous logical address block to write a Segment New of the file. And then, the 2edefrag tool will update the physical data block according to the Segment New of the file. Therefore, each time the logical address block is updated, the physical data block is updated, thereby causing excessive write amplification. Merge LBA module 123, as provided in the present disclosure, may therefore execute a merge LBA command to rearrange the LBA segments of file 129 into a merged LBA segment. Specifically, rearranging the LBA segment of file 129 includes rewriting all logical addresses of the LBA segments of file 129 into a free or unused logical address block (e.g., free or unused LBA segments) in continuous and sequential order such that it becomes a continuous logical address block (e.g., a merged LBA segment). Unlike the conventional e2defrag tool, the merged LBA segment will not be used to update the physical data block (e.g., physical data block 431 in FIG. 4B). The merged LBA segment is used to only update volatile L2P address mapping table 4271 in FIG. 4B. By doing so, since there is no updating physical data block each time updating logical address block, the write amplification is minimized.

Figure 7:
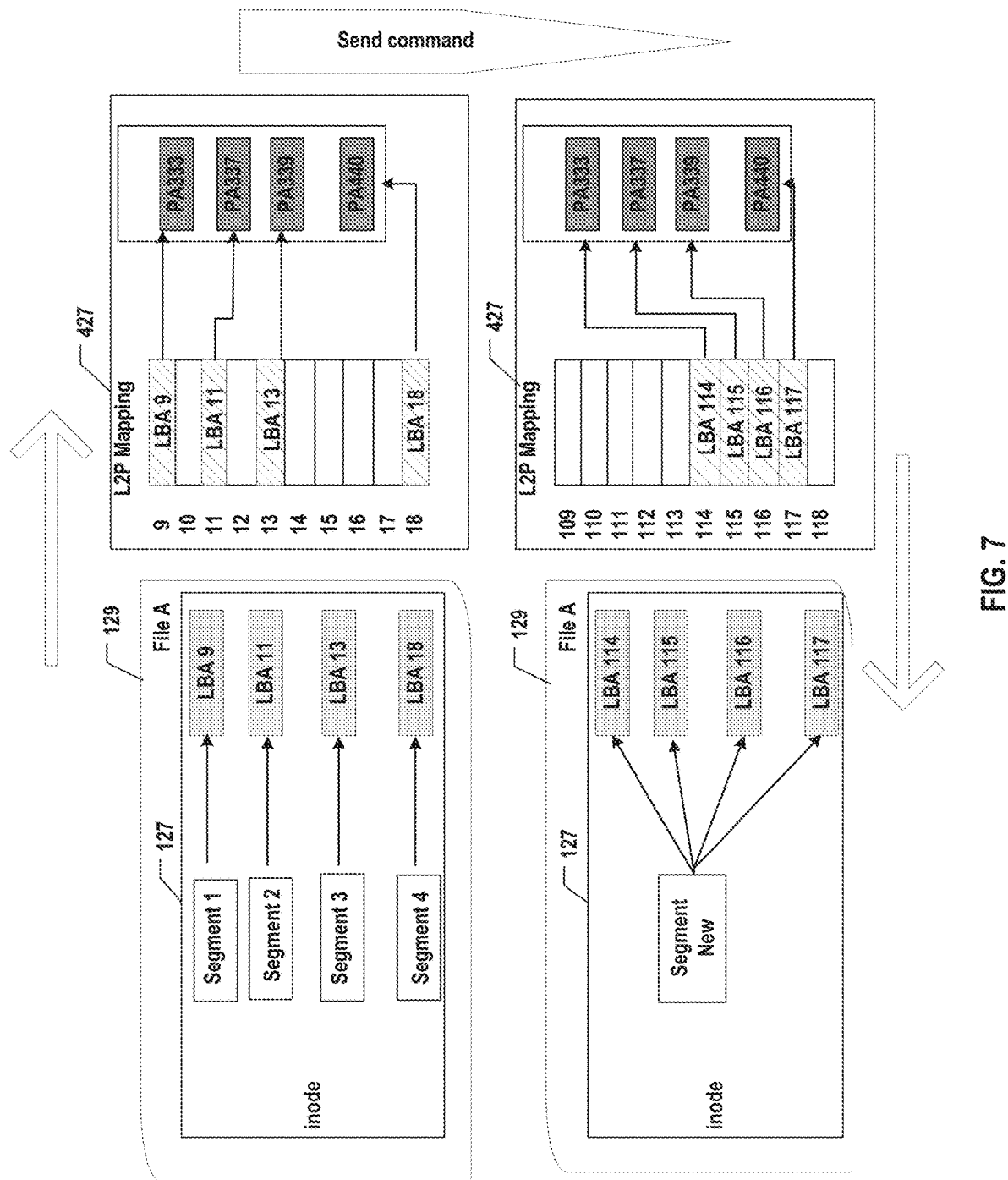
FIG. 7 illustrates a block diagram illustrating an exemplary defragmentation scheme, according to some aspects of the present disclosure.

After executing the merge LBA command, host processor 112 may send a mapping update command causing controller processor (e.g., 408 in FIG. 4A) in memory controller 106 to update volatile L2P address mapping table 4271 according to the merged LBA segment. As shown in FIG. 7, volatile L2P address mapping table 4271 with originally discontinuous and discrete logical addresses (e.g., LBA 9, LBA 11, LBA 13, LBA 18) which corresponds to the logical addresses of LBA segments (e.g., LBA 9, LBA 11, LBA 13, LBA 18) in file 129, is updated to become a continuous logical address block (e.g., LBA 114, LBA 115, LBA 116, LBA 117). The physical addresses (e.g., PA 333, PA 337, PA 339, PA 440) of the updated volatile L2P address mapping table 4271 directed to corresponding physical addresses of physical data block 431 remain unchanged in the above updating process. Therefore, after the defragmentation process, physical data block 431 has not been written and remains the same.

Figure 8:
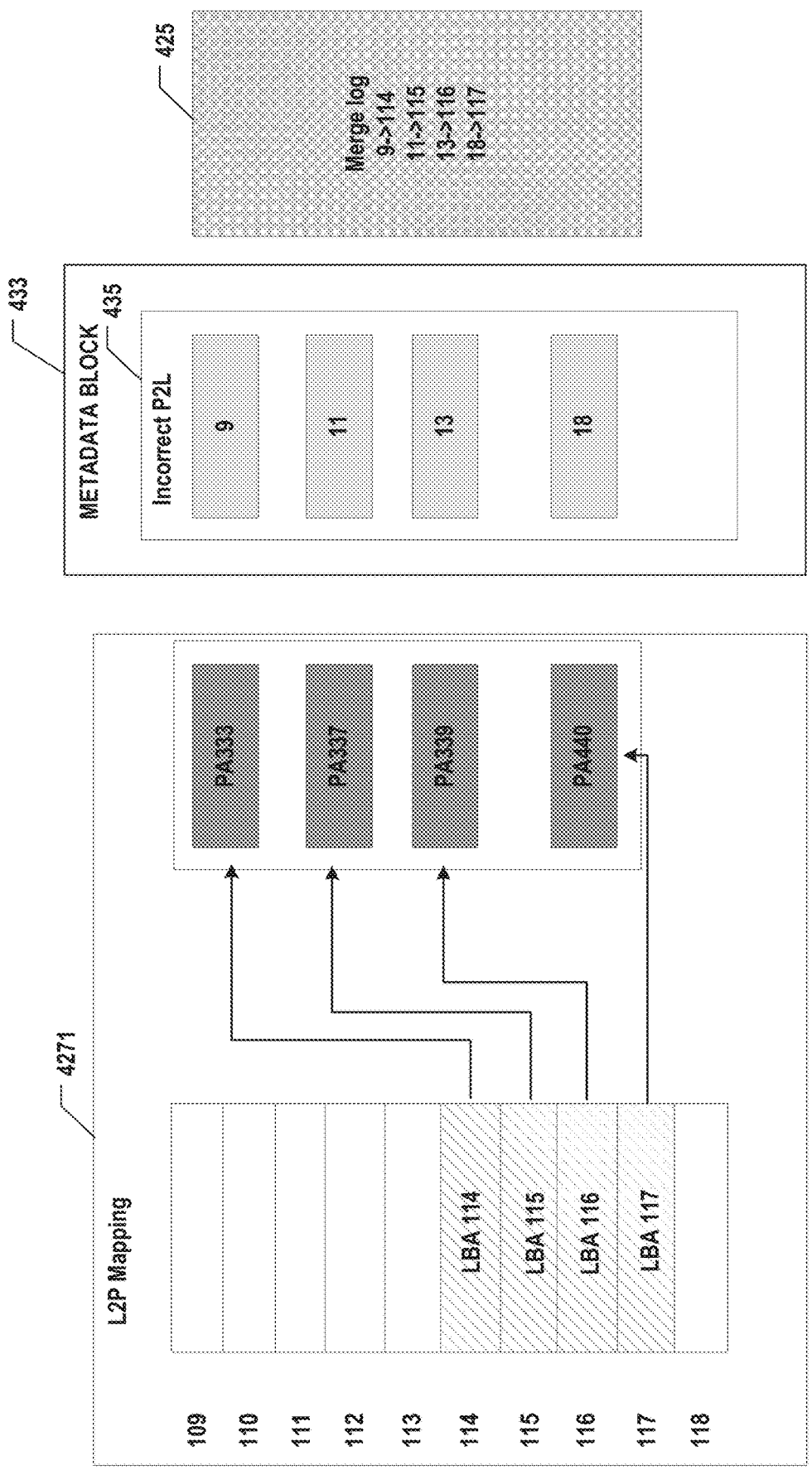
FIG. 8 illustrates a block diagram illustrating an exemplary defragmentation scheme under sudden power loss, according to some aspects of the present disclosure.

FIG. 8 illustrates a block diagram illustrating an exemplary defragmentation scheme under sudden power loss, according to some aspects of the present disclosure. As mentioned above, when a sudden power loss occurs, volatile L2P address mapping table 4271 may not be updated or fail to complete the current updating, and therefore the data may be lost since the physical data is not updated as well. A metadata block (e.g., metadata block 433 in FIG. 4B) of a memory device (e.g., memory device 104) may have an outdated and incorrect P2L mapping table (e.g., P2L address mapping table 435 in FIG. 4B) recording the physical addresses of outdated L2P address mapping table (e.g., LBA 9, LBA 11, LBA 13, LBA 18). Because non-volatile merge log 4253 stores a mapping relation between P2L address mapping table 435 and volatile L2P address mapping table 4271 (e.g., LBA 9 of P2L points to LBA 114 of new L2P, LBA 11 of P2L points to LBA 115 of new L2P, LBA 13 of P2L points to LBA 116 if new L2P, LBA 18 of P2L points to LBA 117 of new L2P) after each updating volatile L2P address mapping table 4271, a new volatile L2P address mapping table 4271 can be rebuilt by using non-volatile merge log 4253 and the retained P2L address mapping table 435 according to the mapping relation.

Figure 9:
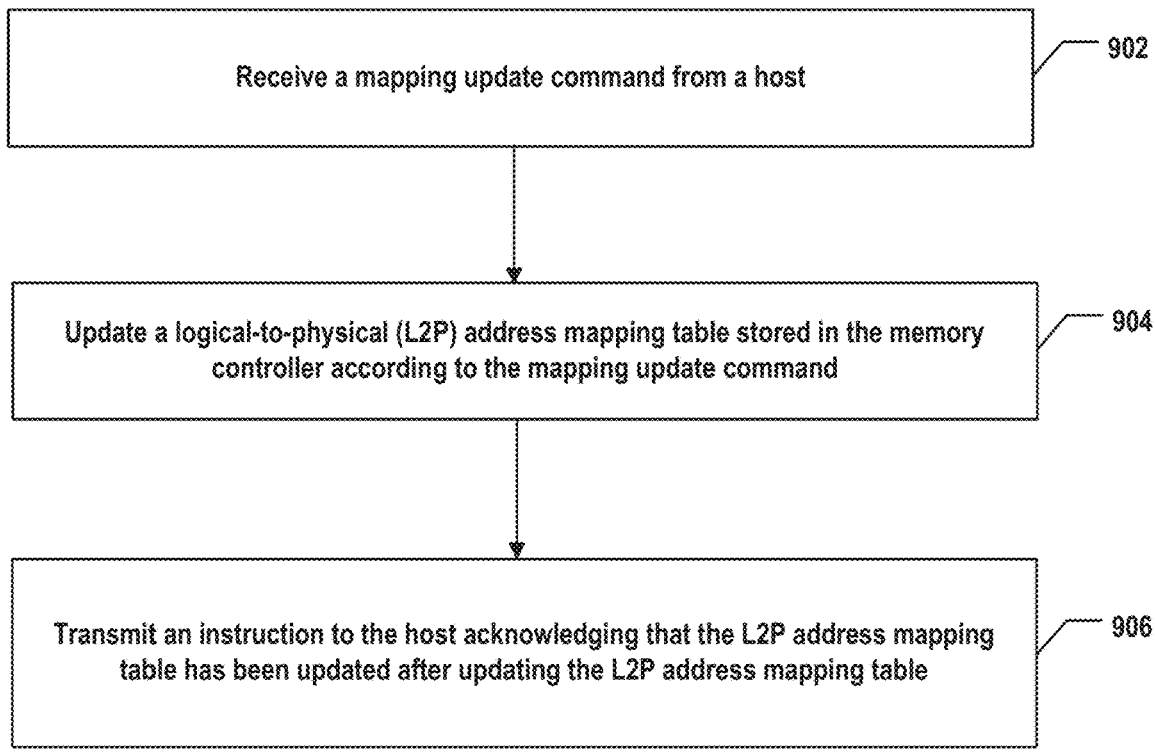
FIG. 9 illustrates a flowchart of an exemplary method for operating a memory controller, according to some aspects of the present disclosure.

FIG. 9 illustrates a flowchart of an exemplary method for operating a memory controller, according to some aspects of the present disclosure. The memory controller may be any suitable memory controller disclosed herein, e.g., memory controller 106 in FIG. 4B. Method 900 may be implemented partially or fully by memory controller 106 as in FIG. 4A. It is understood that the operations shown in method 900 may not be exhaustive and that other operations can be performed as well before, after, or between any of the illustrated operations. Further, some of the operations may be performed simultaneously, or in a different order than shown in FIG. 9.

Referring to FIG. 9, method 900 starts at operation 902 in which a memory controller (e.g., memory controller 106 as in FIG. 4A) receives a mapping update command from a host (e.g., host 108 in FIG. 5). In some implementations, the mapping update command may cause memory controller 106 to start updating module 421.

Method 900 proceeds to operation 904, as illustrated in FIG. 9, in which an L2P address mapping table (e.g., volatile L2P address mapping table 4271 in FIG. 4B) stored in memory controller 106 is updated according to the mapping update command. In some implementations, updating the L2P address mapping table includes rewriting a continuous logical address of a merged LBA segment of a file (e.g., file 129 in FIGS. 5-7) into the L2P address mapping table.

Method 900 proceeds to operation 906, as illustrated in FIG. 9, in which an instruction is transmitted to the host acknowledging that the L2P address mapping table has been updated after updating the L2P address mapping table. In some implementations, once the updating L2P address mapping table is completed, the updating module is configured to transmit an instruction through an interface (e.g., memory controller interface 429 in FIG. 4B) to the host. The host may then update the index node of the file stored in the host memory.

Furthermore, method 900 may further include an operation in which a sudden power loss protection is implemented. Specifically, method 900 may also include recording, in a merge log (e.g., non-volatile merge log 4253 in FIG. 4B), a mapping relation between a P2L address mapping table (e.g., P2L mapping table in FIG. 4B) in a metadata block (e.g., metadata block 433 in FIG. 4B) and the L2P address mapping table. After a sudden power loss and when the system is restarted, method 900 may further include scanning the P2L address mapping table of the metadata block and the merge log. And in response to determining that the merge log is updated, the L2P address mapping table is rebuilt according to the merge log and the P2L address mapping table of the metadata block. And also, in response to determining that the merge log is not updated, the L2P address mapping table is restored according to the P2L address mapping table of the metadata block. These operations can be implemented by recovery module 423 as in FIG. 4B.

Figure 10:
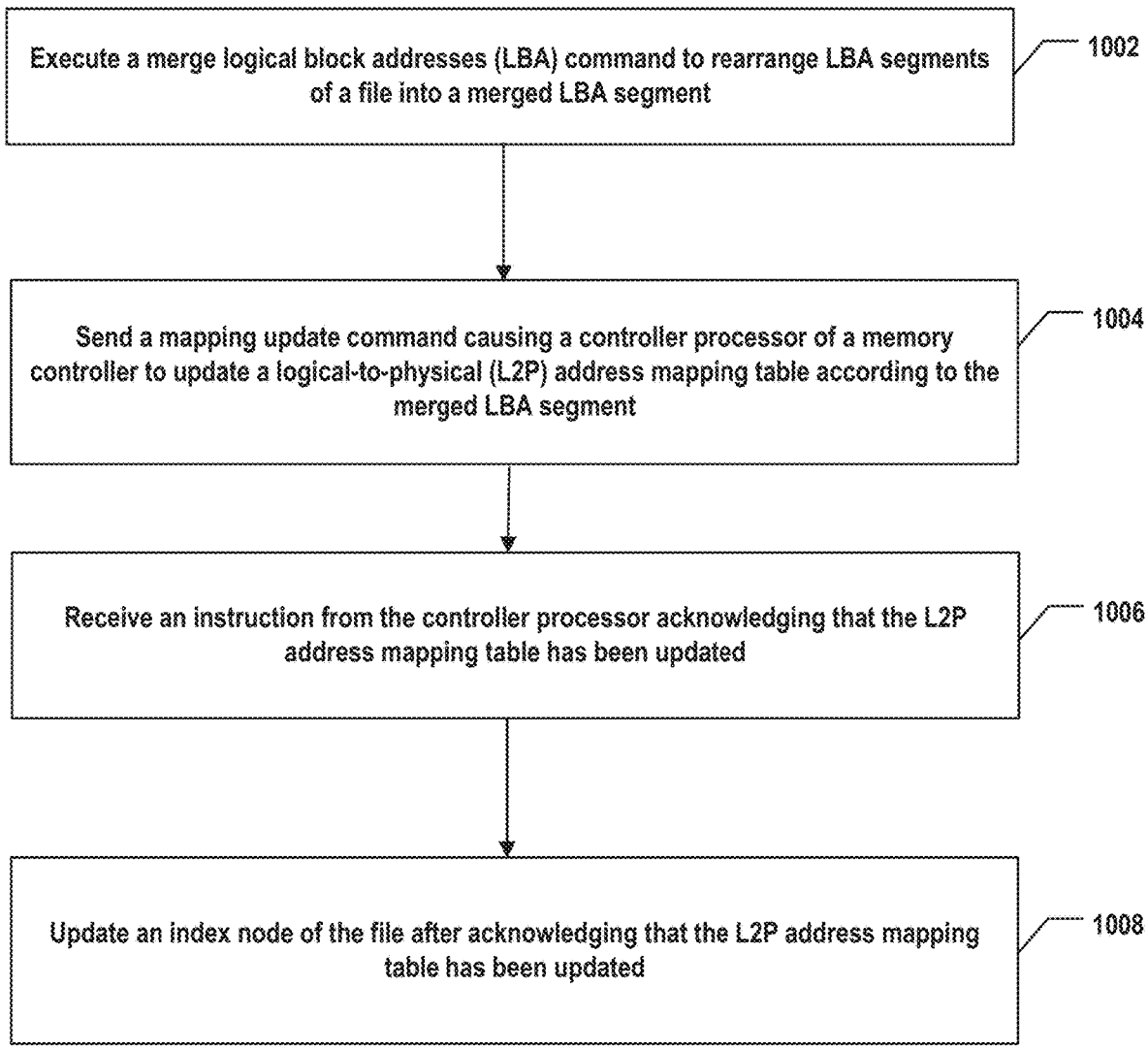
FIG. 10 illustrates a flowchart of an exemplary method for operating a host, according to some aspects of the present disclosure.

FIG. 10 illustrates a flowchart of an exemplary method for operating a host, according to some aspects of the present disclosure. The host may be any suitable host disclosed herein. Method 1000 may be implemented partially or fully by host 108 as in FIG. 5. It is understood that the operations shown in method 1000 may not be exhaustive and that other operations can be performed as well before, after, or between any of the illustrated operations. Further, some of the operations may be performed simultaneously, or in a different order than shown in FIG. 10.

Referring to FIG. 10, method 1000 starts at operation 1002 in which a merge LBA command is executed to rearrange LBA segments of a file (e.g., file 129 as in FIG. 5) stored in a host memory (e.g., host memory 110 in FIG. 5) into a merged LBA segment. In some implementations, the merge LBA command may cause a host processor (e.g., host processor 112 in FIG. 5) to start a merge LBA module (e.g., merge LBA module 123 in FIG. 5). In some implementations, rearranging the LBA segments of the file into the merged LBA segment includes rewriting the LBA segments of the file with logical addresses in discontinuous or discrete order, into the merged LBA segment with logical addresses in continuous and sequential order. In some implementations, rearranging the LBA segments of the file into the merged LBA segment includes sequentially reading the logical addresses of the LBA segments of the file before rewriting the logical addresses of the merged LBA segment, such that it becomes the merged LBA segment that has each and every LBA segments of the file.

Method 1000 proceeds to operation 1004, as illustrated in FIG. 10, in which a mapping update command is transmitted to a memory controller (e.g., memory controller 106 in FIG. 4A), causing a controller processor (e.g., controller processor 408 in FIG. 4A) of the memory controller to update an L2P address mapping table (e.g., volatile L2P address mapping table 4271 in FIG. 4B) according to the merged LBA segment. In some implementations, updating the L2P address mapping table includes rewriting continuous logical addresses of the merged LBA segment of the file into the L2P address mapping table.

Method 1000 proceeds to operation 1006, as illustrated in FIG. 10, in which an instruction is received from the controller processor acknowledging that the L2P address mapping table has been updated. In some implementations, after receiving the instruction, an index node update module (e.g., index node updating module 121) is started.

Method 1000 proceeds to operation 1008, as illustrated in FIG. 10, in which an index node of the file is updated after acknowledging that the L2P address mapping table has been updated.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A memory controller of a storage device, comprising:
   a controller memory for storing a logical-to-physical (L2P) address mapping table corresponding to a file; and
   a controller processor configured to control a memory device of the storage device, receive a mapping update command from a host, and update the L2P address mapping table according to the mapping update command by:
   replacing original logical addresses of logical block address (LBA) segments of the file with new continuous logical addresses of a merged LBA segment of the file, and
   changing an original mapping relation between the original logical addresses of the LBA segments of the file and physical addresses of the file, to a new mapping relation between the new continuous logical addresses of the merged LBA segment of the file and the physical addresses of the file, wherein the L2P address mapping table is stored in a volatile controller memory in the controller memory; and the controller processor is further configured to transmit the updated L2P address mapping table to a physical data block of the memory device and transmit an instruction to the host acknowledging that the L2P address mapping table has been updated in the physical data block of the memory device, wherein the controller processor is configured to generate a merge log by recording the new mapping relation between the new continuous logical addresses of the merged LBA segment of the file and the physical addresses of the file and transmit the merge log to the physical data block of the memory device, wherein the merge log stored in the physical data block updates faster than the L2P address mapping table stored in the physical data block.

2. The memory controller of the storage device of claim 1, wherein the controller memory further comprises:
a non-volatile controller memory, wherein the controller processor is configured to update the L2P address mapping table in the non-volatile controller memory.

3. The memory controller of the storage device of claim 1, wherein in response to a sudden power loss, the controller processor is configured to rebuild the volatile L2P address mapping table according to the merge log stored in the physical data block after a memory system is restarted.

4. The memory controller of the storage device of claim 3, wherein the controller processor is configured to scan a physical-to-logical (P2L) address mapping table of a metadata block and the merge log stored in the physical data block, wherein in response to determining that the merge log stored in the physical data block is updated, the controller processor is configured to rebuild the L2P address mapping table according to the merge log stored in the physical data block, and wherein in response to determining that the merge log stored in the physical data block is not updated, the controller processor is configured to restore the L2P address mapping table according to the P2L address mapping table of the metadata block.

5. The memory controller of claim 1, wherein in response to a memory system of the storage device being restarted, the updated L2P address mapping table is loaded from the physical data block.

6. The memory controller of claim 1, wherein the storage device comprises a solid-state device (SSD), a personal computer memory card international association (PC) card, a compact Flash (CF) card, a smart media (SM) card, a memory stick, a multimedia card, a secure digital memory (SD) card, or a universal Flash storage (UFS).

7. A storage device, comprising:
a memory device comprising a physical data block; and
a memory controller comprising:
a controller memory for storing a logical-to-physical (L2P) address mapping table corresponding to a file; and
a controller processor configured to control the memory device, receive a mapping update command from a host, and update the L2P address mapping table according to the mapping update command by:
replacing original logical addresses of logical block address (LBA) segments of the file with new continuous logical addresses of a merged LBA segment of the file, and changing an original mapping relation between the original logical addresses of the LBA segments of the file and physical addresses of the file, to a new mapping relation between the new continuous logical addresses of the merged LBA segment of the file and the physical addresses of the file, wherein the L2P address mapping table is stored in a volatile controller memory in the controller memory; and the controller processor is configured to transmit the updated L2P addressing mapping table to the physical data block of the memory device and transmit an instruction to the host acknowledging that the L2P address mapping table has been updated in the physical data block of the memory device, wherein the controller processor is configured to generate a merge log by recording the new mapping relation between the new continuous logical addresses of the merged LBA segment of the file and the physical addresses of the file and transmit the merge log to the physical data block of the memory device, wherein the merge log stored in the physical data block updates faster than the L2P address mapping table stored in the physical data block.

8. The storage device of claim 7, wherein the controller memory further comprises:
a non-volatile controller memory, wherein the controller processor is configured to update the L2P address mapping table in the non-volatile controller memory.

9. The storage device of claim 7, wherein in response to a sudden power loss, the controller processor is configured to rebuild the L2P address mapping table according to the merge log stored in the physical data block after the storage device is restarted.

10. The storage device of claim 9, wherein the controller processor is configured to scan a physical-to-logical (P2L) address mapping table of a metadata block and the merge log stored in the physical data block, wherein in response to determining that the merge log stored in the physical data block is updated, the controller processor is configured to rebuild the L2P address mapping table according to the merge log stored in the physical data block, and wherein in response to determining that the merge log stored in the physical data block is not updated, the controller processor is configured to restore the L2P address mapping table according to the P2L address mapping table of the metadata block.

11. The storage device of claim 7, wherein the memory device comprises a three-dimensional (3D) NAND Flash memory device.

12. A method for operating a memory controller of a storage device, comprising:
receiving a mapping update command from a host;
storing a logical-to-physical (L2P) address mapping table corresponding to a file in a volatile controller memory in a controller memory of the memory controller; and
updating the L2P address mapping table according to the mapping update command by:
replacing original logical addresses of logical block address (LBA) segments of the file with new continuous logical addresses of a merged LBA segment of the file, and
changing an original mapping relation between the original logical addresses of the LBA segments of the file and physical addresses of the file, to a new mapping relation between the new continuous logical addresses of the merged LBA segment of the file and the physical addresses of the file;

transmitting the updated L2P addressing mapping table to a physical data block of a memory device of the storage device;

transmitting an instruction to the host acknowledging that the L2P address mapping table has been updated in the physical data block of the memory device;

recording the new mapping relation between the new continuous logical addresses of the merged LBA segment of the file and the physical addresses of the file as a merge log; and transmitting the merge log to the physical data block of the memory device, wherein the merge log stored in the physical data block updates faster than the L2P address mapping table stored in the physical data block.

13. The method of claim 12, further comprising:

in response to a sudden power loss, rebuilding the L2P address mapping table according to the merge log stored in the physical data block after a memory system of the storage device is restarted.

14. The method of claim 13, wherein rebuilding the L2P address mapping table comprises:

scanning a physical-to-logical (P2L) address mapping table of a metadata block in the memory device and the merge log stored in the physical data block;

in response to determining that the merge log stored in the physical data block is updated, rebuilding the L2P address mapping table according to the merge log stored in the physical data block; and in response to determining that the merge log stored in the physical data block is not updated, restoring the L2P address mapping table according to the P2L address mapping table of the metadata block.

* * * * *